Feb. 7, 1967          F. A. HOLLOMON          3,302,942
PANEL FRAME ASSEMBLING APPARATUS
Filed Jan. 29, 1964          8 Sheets-Sheet 1
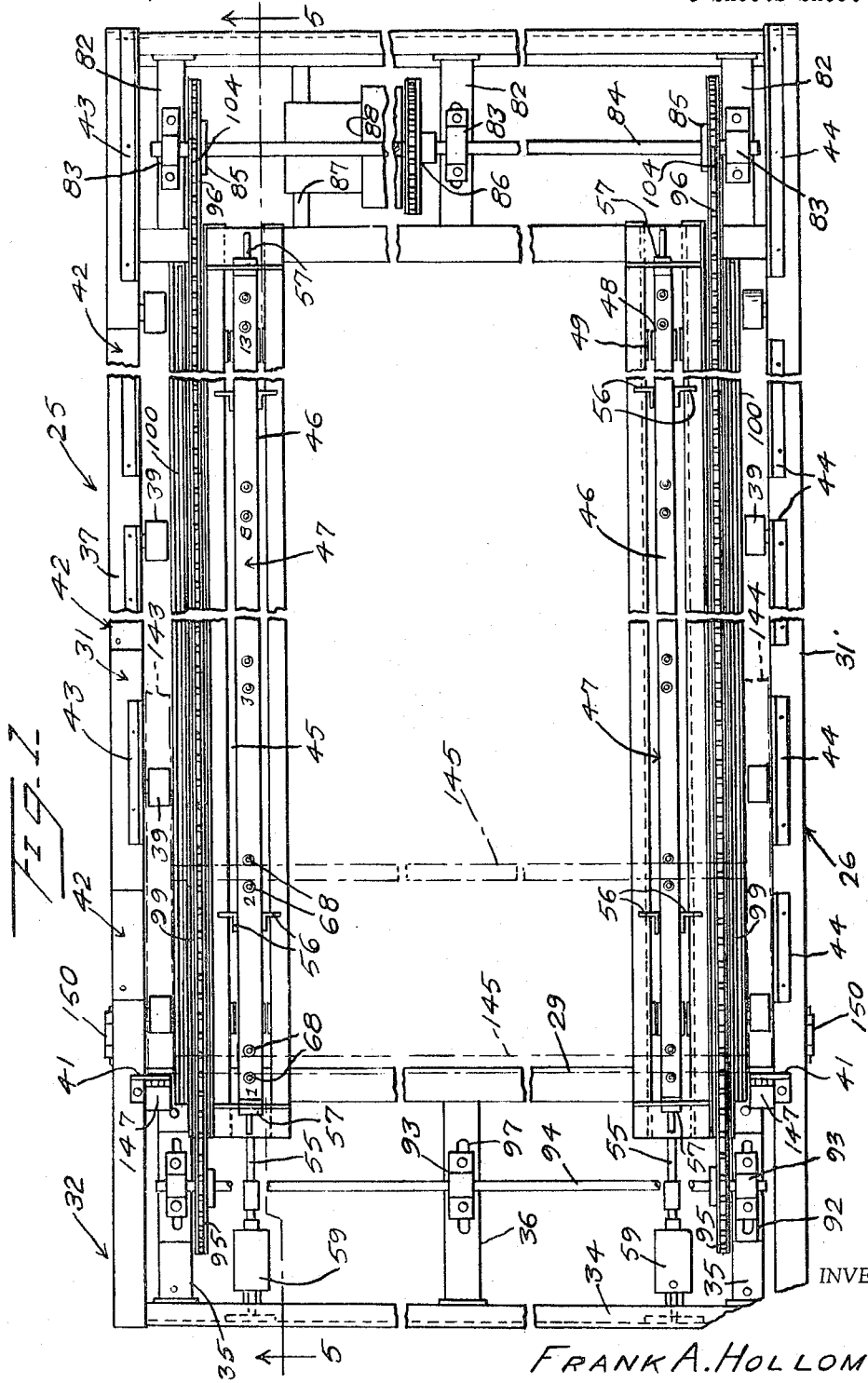
INVENTOR
FRANK A. HOLLOMON
BY John N. Randolph
ATTORNEY

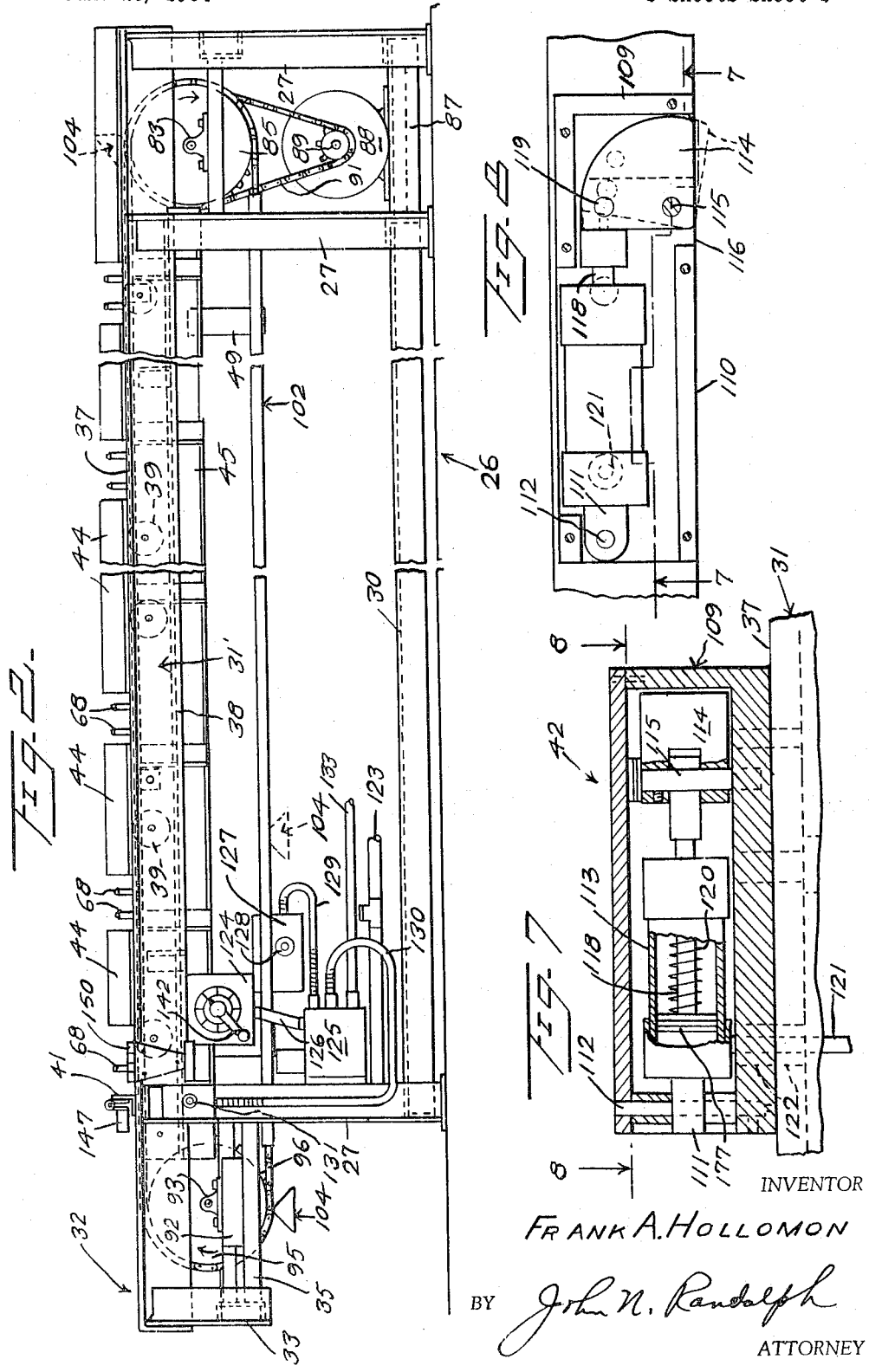

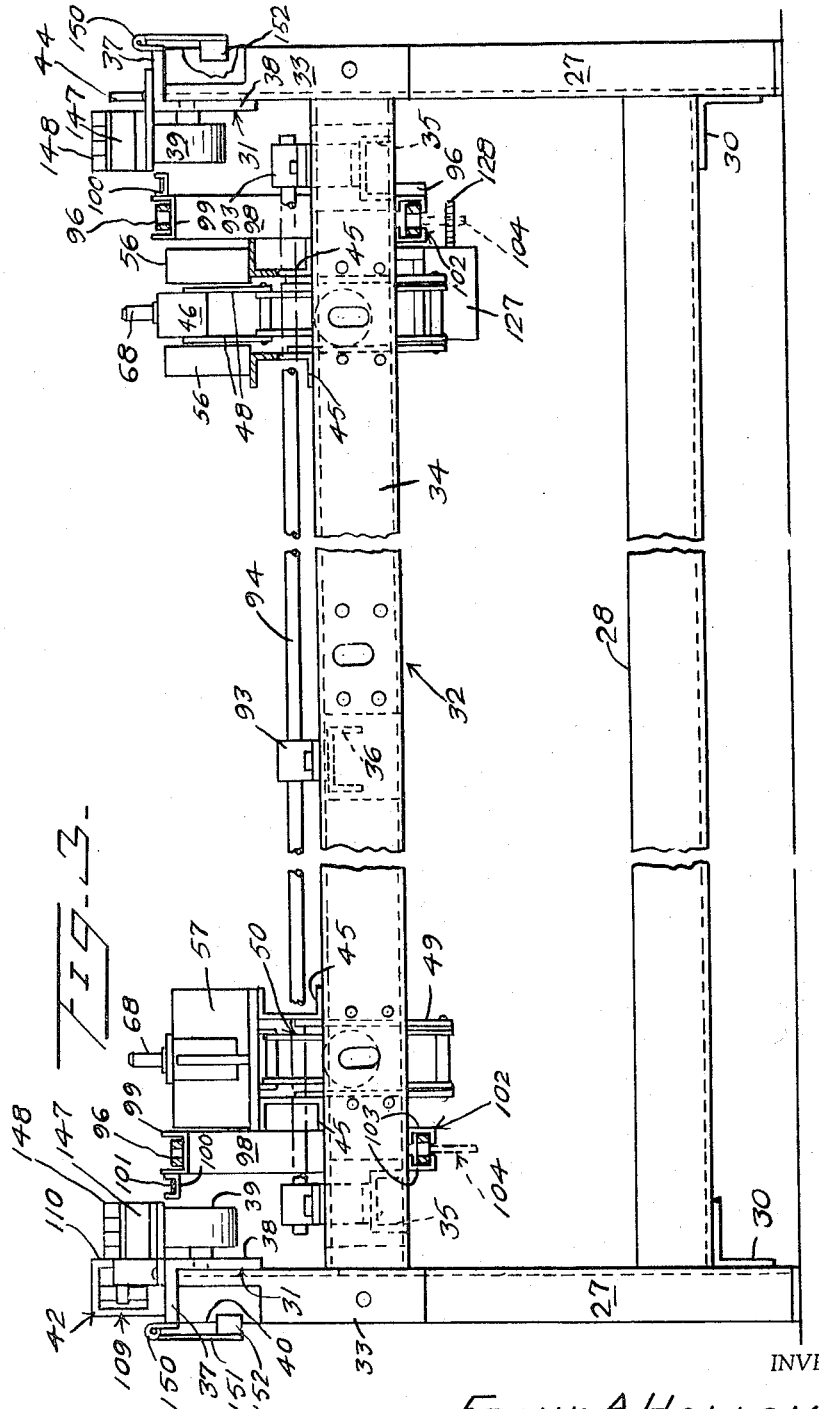

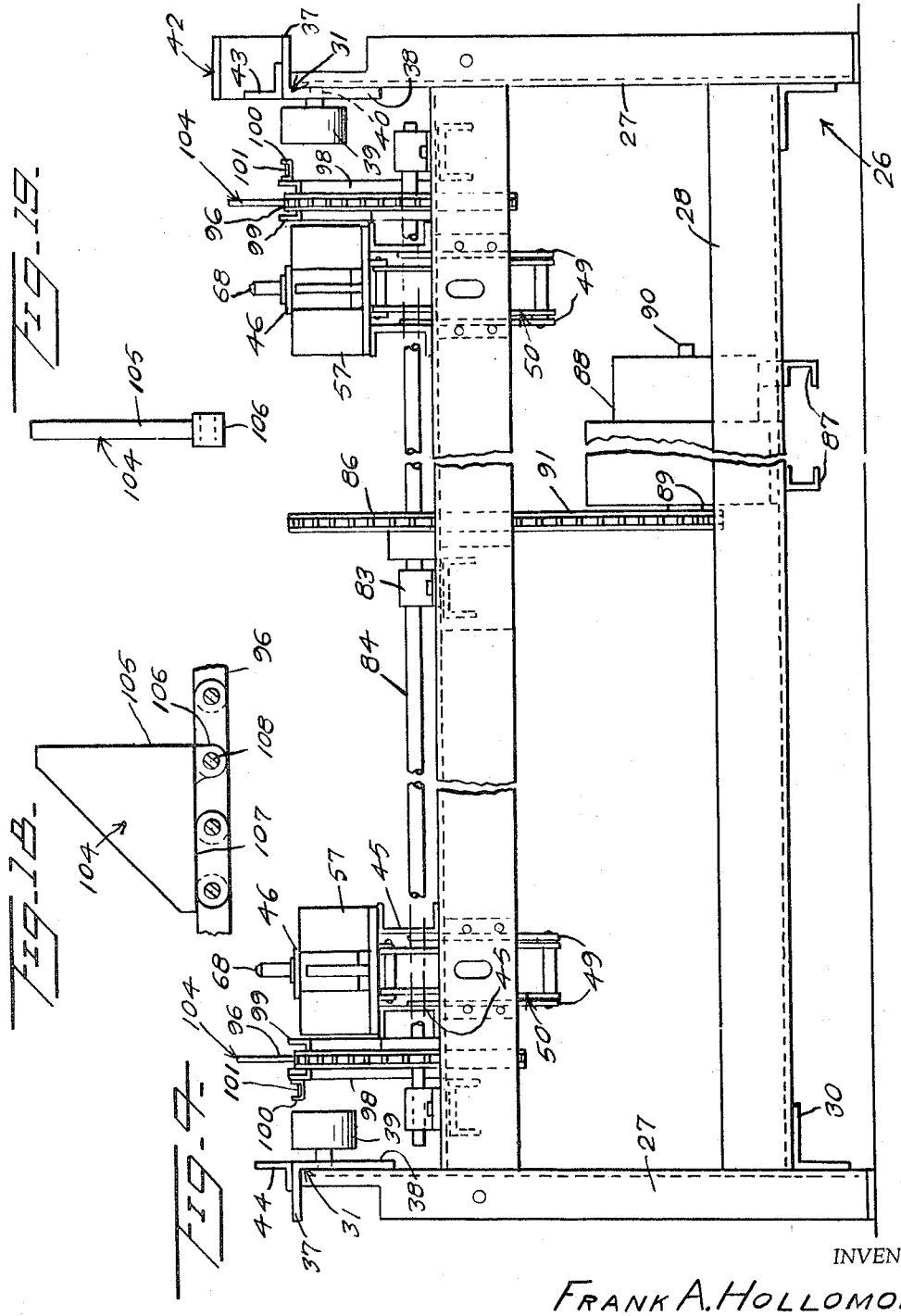

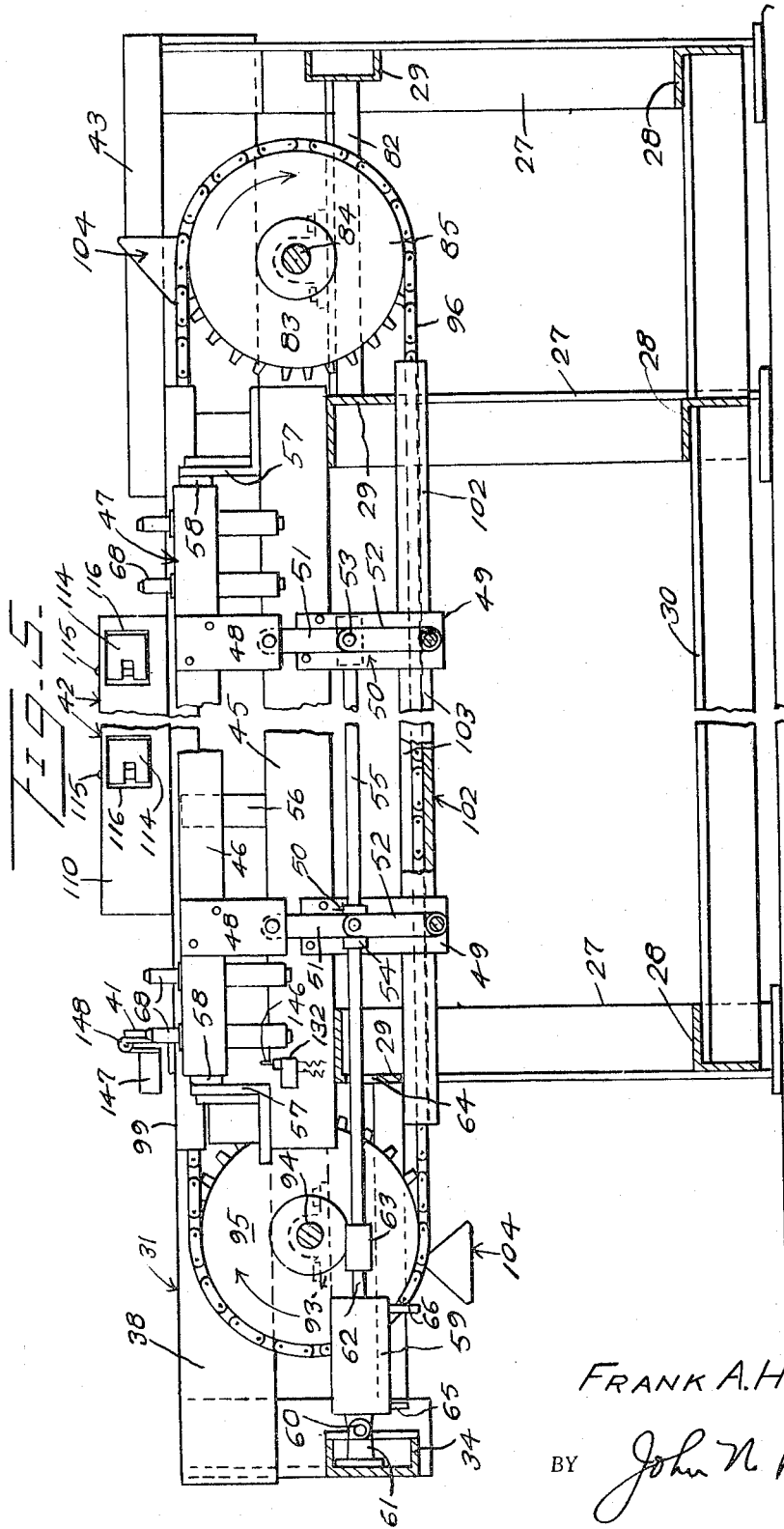

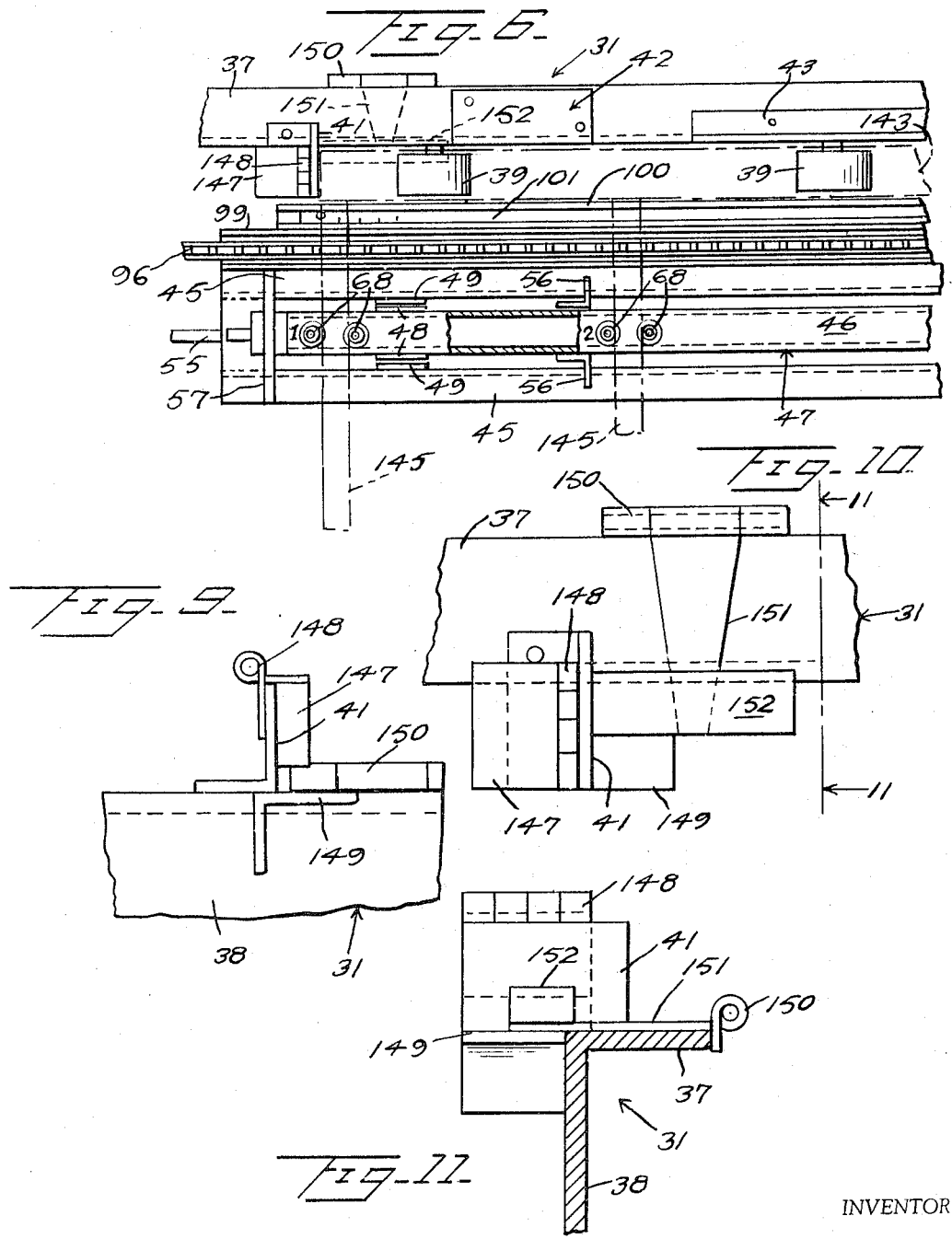

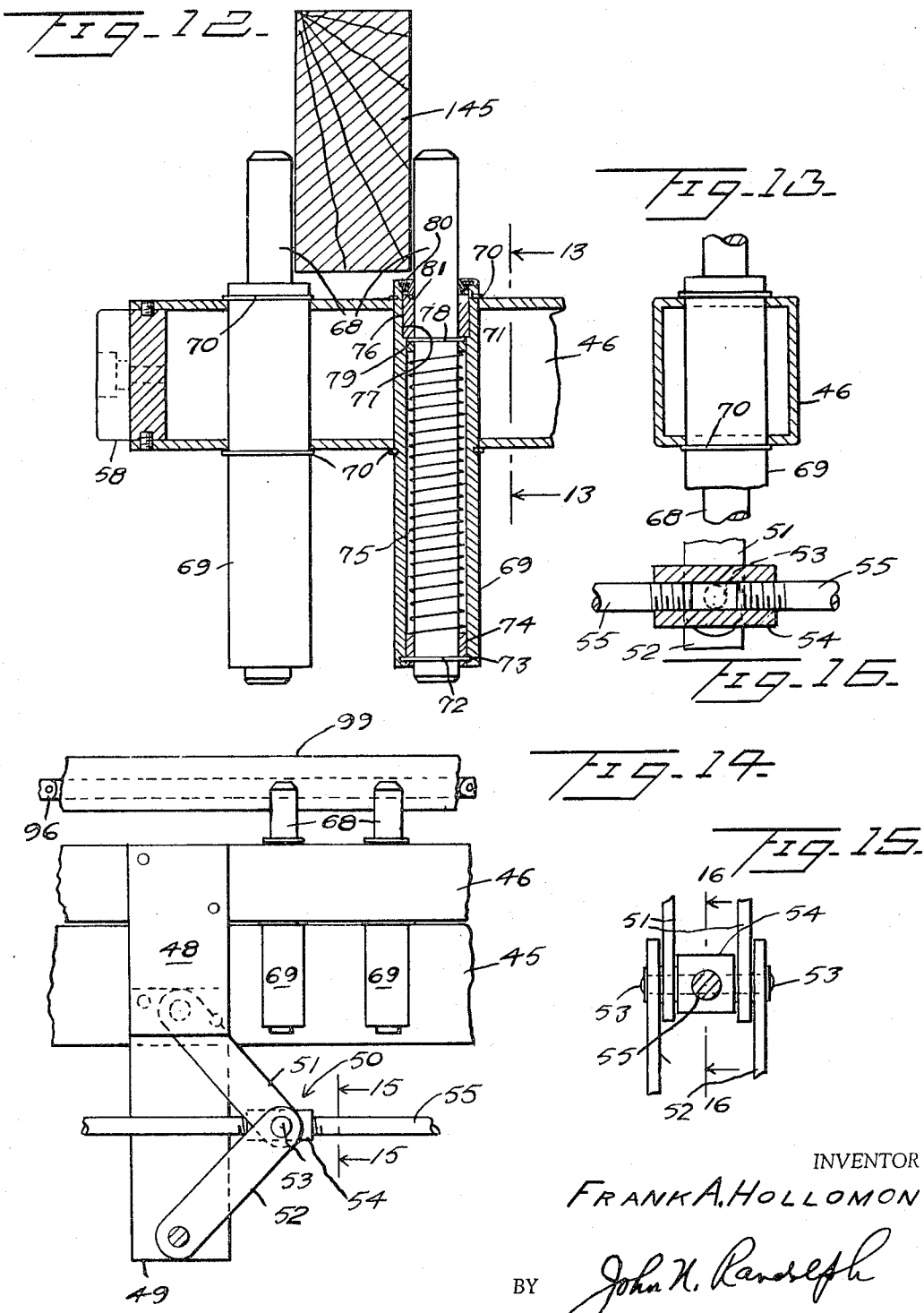

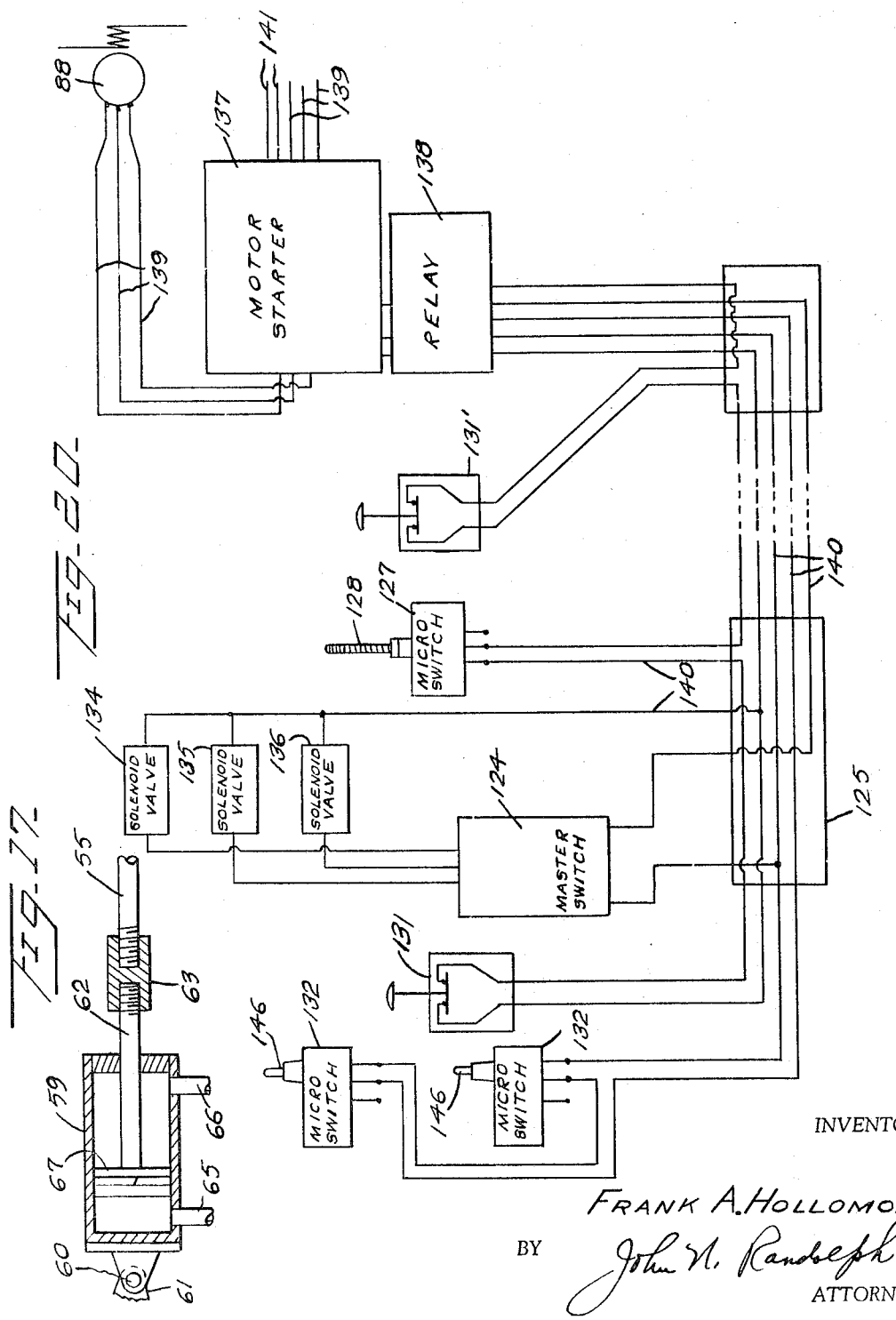

United States Patent Office 3,302,942
Patented Feb. 7, 1967

3,302,942
PANEL FRAME ASSEMBLING APPARATUS
Frank A. Hollomon, Silver Spring, Md., assignor, by mesne assignments, to Hollomon Manufacturing Corp., Hyattsville, Md., a corporation of Delaware
Filed Jan. 29, 1964, Ser. No. 340,924
14 Claims. (Cl. 269—14)

This invention relates to a novel apparatus to facilitate prefabricating frames of building wall panels and which will assure accuracy in locating the studs of the frame relative to the longitudinal frame members, so that subsequent sheathing of the frame can be accomplished more readily.

More particularly, it is an object of the present invention to provide an apparatus including means for holding the studs correctly positioned between the longitudinal frame parts while the frame parts are being clamped together and fastened, and which stud locator means is retractable downwardly out of engagement with the assembled panel frame so that the assembled frame can be slidably removed, without being lifted, from the assembling apparatus.

A further object of the invention is to provide a panel frame assembling apparatus which is adaptable for use as a part of an assembly line for producing prefabricated panels and wherein the assembled panel frame can be slidably propelled, without being lifted or manually handled, from the panel frame assembling apparatus onto another unit of the assembly line.

A further object of the invention is to provide a panel frame assembling apparatus which is so constructed that panel frames to be utilized as parts of corner panels or end panels may be accurately fabricated.

A further object of the invention is to provide an apparatus having a unique arrangement of stud locator units, including individual stud engaging elements which may be vertically retracted to inoperative positions to enable the assembling of double studs or prefabricated door or window inserts in the panel frame and in any desired locations.

Various other objects and advantages of the invention will hereinafter become more fully apparent from the following description of the drawings, illustrating a presently preferred embodiment thereof, and wherein:

FIGURE 1 is a fragmentary top plan view of the panel frame assembling apparatus;

FIGURE 2 is a fragmentary side elevational view thereof;

FIGURE 3 is a fragmentary end elevational view of the apparatus looking from left to right of FIGURES 1 and 2, and on an enlarged scale;

FIGURE 4 is a fragmentary end elevational view looking toward the other end of the apparatus;

FIGURE 5 is an enlarged fragmentary longitudinal sectional view taken substantially along the line 5—5 of FIGURE 1;

FIGURE 6 is an enlarged fragmentary top plan view of a portion of the apparatus;

FIGURE 7 is an enlarged fragmentary longitudinal sectional view taken substantially along the line 7—7 of FIGURE 8, illustrating a part of the apparatus;

FIGURE 8 is a horizontal sectional view taken substantially along a plane as indicated by the line 8—8 of FIGURE 7;

FIGURE 9 is an enlarged fragmentary longitudinal sectional view of a part of the apparatus as seen in FIGURE 6;

FIGURE 10 is a fragmentary top plan view of the structure as shown in FIGURE 9 and illustrating another position of the parts;

FIGURE 11 is a transverse sectional view taken substantially along a plane as indicated by the line 11—11 of FIGURE 10;

FIGURE 12 is an enlarged fragmentary longitudinal sectional view, partly in elevation, of a portion of one of the stud locator units;

FIGURE 13 is a fragmentary cross sectional view thereof taken substantially along a plane as indicated by the line 13—13 of FIGURE 12;

FIGURE 14 is a fragmentary side elevational view of another portion of one of the stud locator units, together with certain other parts of the apparatus, associated therewith, and on a reduced scale relative to FIGURE 12;

FIGURE 15 is an enlarged fragmentary sectional view, primarily in elevation, taken substantially along a plane as indicated by the line 15—15 of FIGURE 14;

FIGURE 16 is a fragmentary sectional view taken substantially along a plane as indicated by the line 16—16 of FIGURE 15;

FIGURE 17 is a fragmentary longitudinal sectional view of another part of the apparatus;

FIGURE 18 is a fragmentary side elevational view of a part of the endless conveyor unit;

FIGURE 19 is an end elevational view of the conveyor lug as seen in FIGURE 18 and looking from right to left thereof, and FIGURE 20 is a diagrammatic view illustrating the electric circuits of the assembling apparatus.

Referring more specifically to the drawings, the panel frame assembling apparatus in its entirety is designated generally 25 and includes an elongated supporting structure or table, designated generally 26. The table 26 may be constructed in various lengths, usually twenty feet or longer, and along each side thereof is provided with a plurality of upright supporting legs 27. Additional legs 27 will ordinarily be provided along each longitudinal side of the table 26 between the left-hand end leg and the two legs disposed at the right-hand end of the table, as seen in FIGURE 2. Complementary legs at each side of the table 26 are connected together by lower cross braces 28 and upper cross braces 29, as best seen in FIGURE 5. The table 26 additionally includes longitudinal bottom braces 30 each of which extends between and connects with each leg 27 on one side of the table, and longitudinal top members 31 and 31' each of which is secured to the upper ends of the legs at one longitudinal side of the table. The top members 31 and 31' extend beyond the legs 27 at the left hand end of the table 26, as seen in FIGURE 2, to provide a part of a table extension, designated generally 32. Said table extension 32 includes hanger members 33 which are secured to and depend from the outer ends of the top members 31 and 31' and which support a cross member 34, as best seen in FIGURE 3. Braces 35 and 36 extend between said cross member 34 and the upper cross brace 29 located nearest thereto, as seen in FIGURE 1.

The top members 31 and 31' have coplanar top flanges 37 and depending inner vertical flanges 38, as seen in FIGURE 3. Rollers 39 are journaled on axles 40 which extend inwardly from the vertical flanges 38 and said rollers have topmost peripheral portions which are disposed coplanar with the top surfaces of the top flanges 37.

A fixed transverse or end abutment 41 is secured on and rises from each top flange 37. The abutments 41 are located in the same transverse vertical plane, as seen in FIGURE 1, at the end of the table 26 from which the extension 32 projects. A plurality of fluid pressure actuated clamps 42 are disposed longitudinally on and fixed to the flange 37 of the member 31 in longitudinally spaced relation to one another, and a plurality of guides 43 are mounted on said top flange 37 between the clamps 42, and between the right hand end of the table and the clamp 42 located adjacent thereto. The guides 43 extend upwardly from the inner edge of said top flange 37, as seen in FIGURE 4. Stationary abutments 44 are fixed to the upper surface of the top flange 37 of the member 31' in longitudinally spaced relation to one another and extend upwardly therefrom and have inner surfaces disposed coplanar with the inner face of the flange 38 of said member 31', as seen in FIGURE 4. Said inner faces of the fixed abutments 44 are disposed in a plane at a right angle to the plane of the transverse abutments 41.

Pairs of beams 45 of channel shaped cross section are supported on the upper cross members 29 and extend between the left-hand-most cross member 29 and the cross member 29 disposed next to the right-hand-most cross member, as clearly illustrated in FIGURE 1. One pair of beams 45 is disposed adjacent to and spaced inwardly from the top member 31 and the other pair of beams 45 is similarly disposed relative to the top member 31'. Beams 45 of each pair of beams are transversely spaced relative to one another and have their channels opening away from one another, as seen in FIGURE 4.

A stud locating bar 46 is disposed above each pair of beams 45 and constitutes a part of a stud locating unit 47, and each bar 46 is in the form of a rectangular tube, as seen in FIGURE 13, and has plates 48 fixed to and depending from opposite sides thereof at longitudinally spaced points. Hanger members 49, as seen in FIGURE 5, are fixed to and depend from the adjacent sides of the beams 45 and are connected to the plates 48 by toggle linkages 50. Each of the toggle linkages 50, as seen in FIGURES 5, 14, 15 and 16, includes a pair of links 51 which are pivoted to and depend from a pair of the plates 48, a pair of links 52 which are pivoted to and rise from the hangers 49, and trunnions 53 to which the overlapping adjacent ends of the links 51 and 52 are pivotally connected and which project from opposite sides of a trunnion block 54 which the links straddle. An actuating rod 55 is composed of sections which threadedly engage in the blocks 54 for interconnecting all of the linkages 50 of each stud locator unit 47. Guide members 56 are fixed to and rise from the beams 45 at longitudinally spaced points, and said guide members 56 of each pair of beams straddle the locator bar 46 to permit said bar to have free vertical sliding movement but to prevent any lateral movement of the bar relative to the beams. Abutment members 57 are fixed to and rise from the ends of each pair of beams 45. The locator bars 46 have button elements 58 which protrude from the ends thereof and which slidably engage the abutments 57 to prevent endwise movement of the bars 46.

As seen in FIGURE 5, fluid pressure cylinders 59 are pivotally connected at their outer ends at 60 to brackets 61 which are secured to and project inwardly from the member 34. Piston rods 62 extend slidably through the inner ends of the cylinders 59 and are coupled at 63 to the adjacent ends of the rods 55. The rods 55 extend through openings 64 in the cross frame members 29 which support the beams 45.

The cylinders 59 are preferably pneumatic cylinders having conduits 65 and 66 opening into the ends thereof. When air is admitted through the conduits 66 to the cylinders 59 the inner ends of said cylinders are pressurized to displace the pistons 67 to the left, as seen in FIGURE 17, while air is exhausted from the left hand ends of said cylinders through the conduits 65. A pull is thus exerted from right to left on the piston rods 62 and rods 55 for moving the toggle linkages 50 to their extended positions of FIGURE 5, for supporting the stud locator units 47 in their fully raised positions of FIGURE 5. When air is admitted to the outer ends of the cylinders 59 and exhausted from the inner ends thereof, pistons 67, piston rods 62 and rods 55 are displaced from left to right of FIGURES 5 and 17 for retracting the linkages 50 to lower the locator units 47 to the retracted, inoperative position of FIGURE 14. It will be understood that fluid pressure is supplied simultaneously to both cylinders 59 for simultaneously raising and lowering the two stud locator units 47.

Each stud locator unit 47 includes a plurality of pairs of stud locator elements 68 which extend upwardly from the bar 46. The spacing between the centers of adjacent pairs of the stud locator elements 68 is usually sixteen inches. As seen in FIGURE 12, each stud locator element or pin 68 is mounted for vertical sliding movement in a sleeve 69 which extends vertically through the bar 46 and is supported immovably therein by split rings 70 which engage grooves 71 of the sleeve, and which rings bear against the top and bottom surfaces of the bar 46. Each sleeve 69 carries an internal split ring 72 which is mounted in an internal groove 73 near its lower end, and through which the pin or element 68 slidably extends. The ring 72 supports a bushing 74 which in turn supports the lower end of a compression spring 75 which fits in the sleeve 69 around the pin 68. A bushing 76 fits in an enlarged upper portion 77 of the sleeve 69, and the pin 68 slidably engages in said bushings 74 and 76. A split ring 78 engages in a groove, not shown, of the pin 68 and is engageable with the bushing 76 to limit upward movement of the pin relative to the sleeve. A bushing 79 is disposed around the pin 68 beneath the ring 78 and bears against the upper end of the spring 75 for sliding movement with said ring and pin within the sleeve 69. An internal split ring 80 is mounted in the upper end of the sleeve 69 and confines one or more conical washers 81 between said ring and the upper end of the bushing 76 and around the pin 68, and which washers function as wipers to prevent sawdust or other foreign matter from entering the sleeve 69 when the pin 68 is displaced downwardly thereof. It will be readily apparent that the springs 75 normally maintain the locator elements or pins 68 in their fully raised positions relative to the bars 46, as seen in FIGURES 5, 12 and 14.

As seen in FIGURE 1, three braces 82 extend between and are secured to the two upper cross braces 29 at the right hand end of the table 26. Each brace 82 supports a bearing 83, which bearings journal a shaft 84 to which is fixed two sprocket wheels 85 and an intermediate sprocket wheel 86. The two bottom cross braces 28 at the right hand end of the table 26 have attached thereto supporting members 87 on which an electric motor 88 is secured. A small sprocket wheel 89, as seen in FIGURE 2, is fixed to the armature shaft 90 of the motor 88 and is connected by an endless chain 91 to the intermediate sprocket wheel 86 for driving the shaft 84 and the sprocket wheels 85.

Supports 92, as seen in FIGURE 1, are mounted on the members 35, and bearings 93 are mounted on the supports 92 and on the intermediate support 36. The end bearings are positioned by the supports 92 in alignment with the bearing of the intermediate support 36 for journaling an idler shaft 94. Sprocket wheels 95 are fixed to the shaft 94 and align with the sprocket wheels 85, and endless chains 96 are trained over the aligned sprocket wheels 85 and 95 and extend substantially the length of the supporting structure 26. The bearings 93 are provided with conventional adjustment means 97 for adjusting the shaft 94 longitudinally of the supporting structure 26 for taking up slack in the chains 96.

Posts 98 are fixed to and extend upwardly from the outer sides of the outermost beams 45 of the two pairs of beams, and the longitudinally aligned posts 98 support a rail 99 of upwardly opening channel shape cross section. The rails 99 provide supporting channels in which the top flights of the chains 96 travel. In addition, the top surfaces of said rails 99 are disposed coplanar with the uppermost portions of the rollers 39 to provide stud supports, as will hereinafter become apparent. A member 100 of channel shape cross section is secured to and extends along the outer side of each rail 99 and is disposed slightly below the top portion of said rail. The channels 100 each supports a tape 101 having a linear scale, as best seen in FIGURE 6.

Bottom chain guides 102 are provided for the lower flights of the chains 96 and are secured to the undersides of the upper cross members 29 which are disposed between the sprocket wheels 85 and 95. Each of the chain guides 102 comprises two opposed inwardly facing channel members 103 in which the chain is slidably received, as best seen in FIGURE 3. Each chain 96 carries two lugs 104 which are spaced halfway apart around the chain. The lugs 104 of the two chains 96 are disposed in transverse alignment with one another. As best seen in FIGURES 18 and 19, each lug 104 has a leading edge 105 which extends perpendicularly upward from the upper flight of the chain 96 thereof. Each lug 104 has an apertured boss or bearing 106 which depends from its bottom edge 107 at the leading edge 105 of said lug. The apertured boss or bearing 106 is disposed crosswise of the plane of the lug and fits between links of the chain 96 and has one of the chain pins 108 engaging therethrough for pivotally attaching the lug to the outer side of the chain. The bottom edge 107 of the lug engages on the outer side of the chain, behind said leading edge 105, to prevent the lug from swinging counterclockwise relative to the chain beyond its position of FIGURE 18, for a purpose which will hereinafter become apparent. The channel members 103 are spaced slightly apart, as seen in FIGURE 3, so that the lugs can depend downwardly therebetween from the bottom flights of the chains 96 which are traveling in the chain guides 102 from the sprocket wheels 85 toward the sprocket wheels 95, during which travel the lugs 104 normally hang in a depending position, as seen in FIGURE 5.

The fluid pressure clamps 42 each includes an elongated housing 109 which is disposed on and secured to the top flange 37 of the member 31, so that a longitudinal front wall 110 thereof is disposed substantially flush with the inner face of the flange 38 of said member 31, as seen in FIGURE 3. As seen in FIGURES 7 and 8, an air cylinder 113 is disposed longitudinally within the housing 109 and has an apertured lug 111 which projects from a closed rear end thereof and which is pivotally connected to a pin 112 which extends vertically through the housing 109, at the end thereof located nearest the abutment 41. A clamping dog 114 is disposed in the other end of the housing 109 and is pivotally connected to a vertically disposed pin 115 to swing outwardly through an opening 116 in the front wall 110. A piston 117 is slidably disposed in the cylinder 113 and has a piston rod 118 extending slidably through the other cylinder end and which is pivotally connected by a pin 119 to the dog 114 at a point spaced from the pivot 115, as best seen in FIGURE 8. A compression spring 120 is disposed in the cylinder 113 around the piston rod 118 and bears against the piston 117 for urging the piston and piston rod away from the dog 114, for swinging the dog inwardly of the housing 109 to its retracted inoperative position as illustrated in full lines in FIGURE 8. An air hose 121 extends through aligned openings 122 of the flange 37 and the bottom of the housing 109 communicates with the cylinder 113, between the end thereof from which the lug 111 projects and the piston 117.

Compressed air is supplied to the conduits 65 and 66 of the two air cylinders 59 and to the conduits 121 of the air cylinders 113 from an air pressure supply conduit 123, as seen in FIGURE 2.

A conventional rotary type electric switch 124 is mounted on the supporting structure 26 beneath the top member 31' and adjacent the left hand end of the machine, as seen in FIGURE 2. A junction box 125 is mounted on the supporting structure 26 beneath the switch 124 and wiring is carried between said junction box and the switch 124 through a conduit 126. A normally closed microswitch 127 is supported by one of the channel members 103 and has a wand or blade 128 which projects outwardly therefrom across the path of travel of the lugs 104 of the chain 96 which travels in the bottom chain guide 102 of which said channel member 103 forms a part. A conduit 129 carrying wiring leads between the junction box 125 and the microswitch 127, and another conduit carrying wiring, designated 130, leads from the junction box 125 to a pushbutton emergency switch 131 which is mounted on the leg 27 located nearest the switch 124. Normally open microswitches 132, one of which is seen in FIGURE 5, are mounted on two of the members 45, one beneath each of the pin bars 46. A conduit 133 carries the electric wiring from the junction box 125 to the electric motor 88.

An electric circuit for the apparatus 25 is illustrated in FIGURE 20 and includes, in addition to the parts heretofore described, three solenoid valves 134, 135 and 136, a conventional motor starter 137 and a conventional relay 138. The motor starter 137 is located between the relay 138 and the motor 88 and said relay is located between the junction box 125 and the motor starter. A second emergency switch 131' is provided in the wiring circuit and may be disposed in any desired position, for example, at the corner of the table located remote from the emergency switch 131. Current is supplied for operating the motor 88 from a suitable current source, not shown, through wiring 139 which leads through the motor starter 137 to the motor 88, and current is supplied for the wiring 140 of the control circuit by conductors 141 which also lead from a suitable current source, not shown.

The panel frame assembling apparatus may be utilized as follows: The actuator 142 of the rotary switch 124 is initially turned from an upright "off" position clockwise approximately 45° to its position of FIGURE 2 for completing an electric circuit to the solenoid valve 135 for supplying compressed air through the conduits 66 to the inner ends of the cylinders 59 for moving the pistons 67, piston rods 62 and the rods 55 from right to left of FIGURE 17, for moving the two stud locator units 47 from their lowered positions of FIGURE 14 to their raised positions of FIGURE 5. The solenoid valve 135 is of the multiple type so that air is bled from the cylinders 59 through the conduits 65 as the forward ends of said cylinders are pressurized through the conduits 66. A frame member 143, as seen in FIGURE 1, constituting a top plate or header, is then positioned on the rollers 39 of the top member 31 with its outer side against the front walls 110 of the clamps 42 and also against the guide members 43, with one end of said member 143 abutting the abutment or squaring stop 41 of the member 31. A sill member 144, corresponding to the top plate 143, is then positioned on the other set of rollers 39 of the top member 31', with its outer side against the fixed squaring stops 44 and with one of its ends abutting the other end abutment or squaring stop 41, carried by the member 31'. Studs 145 are then engaged in the first and second pairs of locator pins or elements 68 of the two stud locator units 47, designated 1 and 2 in FIGURE 1. Said studs 145 and the remaining studs, hereinafter referred to, which engage between the locator elements 68 are supported on the rails 99 and are disposed with respect to the stud locator units 47, as illustrated in FIGURE 12. The ends of the studs 145 abut the top plate 143 and the sill 144, between which said studs are disposed, and the first stud 145 also abuts the transverse squaring stops 41 and is maintained thereby at a right angle to the sill member 144 which is abutting the other set of squaring stops 44.

The switch actuator 142 is then rotated clockwise approximately another 45° to its second position for completing an electric circuit to the solenod valve 134 which controls the supply of compressed air to the cylinder 113 of the air clamp 42 which is located nearest the abutment 41, for supplying air through the conduit 121 of said air clamp to pressurize the outer end of the cylinder 113 so that the piston rod 118 will exert a thrust against the clamping dog 114 of said air clamp for swinging said clamping dog clockwise, as seen in FIGURE 8, about its pivot 115 from its full line to or beyond its dotted line position. This will displace the top plate 143 toward the two studs 145 to effectively clamp said studs between the top plate 143 and the sill 144. Additionally, this swinging movement of the dog 114 will tend to displace the top plate 143 from right to left of FIGURE 1 to insure that the left hand end thereof is maintained in abutment with the squaring stop 41 of the member 31.

The portion of the top plate 143 which is located to the right of said aforementioned, first clamp 42, remains unclamped so that additional studs 145 may be positioned between the other transversely aligned pairs of locator elements 68. The apparatus 25 as illustrated is adapted for use in assemblying a panel frame, composed of the parts 143, 144 and 145, which is sixteen feet in length, and the pairs of locator elements 68 are spaced sixteen inches apart, center-to-center, except that the spacing between the first and second sets of locator elements of each unit 47 is preferably fifteen and three sixteenths inches, center-to-center. Thus, each stud locator unit 47 includes thirteen pairs of locator elements 68. After the additional studs 145, not shown, have been positioned between the remaining pairs of locator elements 68, the switch actuator 142 is turned clockwise approximately another 45° to a third "on" position, for energizing the solenoid valve 136 which controls the supply of air to the remaining four clamps 42 for actuating said clamps in the aforementioned manner, to clamp all of the studs between the top plate 143 and the sill 144 from end-to-end of said members.

While the frame parts are thus held clamped, the studs are nailed to the sill member 144 through the spaces between the fixed squaring stops 44, and to the top plate 143 through the spaces between the clamps 42 and guides 43 and also through the spaces between said guides.

The switch actuator 143 is then turned clockwise approximately another 45° to its fourth "on" position. In this position the solenoid valves 134 and 136 are de-energized to allow air to be bled from the cylinders 113 of all of the clamps 42 through the conduits 121, so that the springs 120 can move the pistons 117 and piston rods 118 from right to left of FIGURE 7, for swinging the clamping dogs 114 counterclockwise as seen in FIGURE 8 back to their full line released positions. At the same time, the solenoid valve 135 is reversed for supplying air to the outer ends of the cylinders 59 through the conduits 65, and for bleeding air from the other ends of said cylinders through the conduits 66, to displace the parts 67, 62 and 55 from left to right of FIGURE 17 for moving the toggle linkages 50 from their extended positions of FIGURE 5 to their retracted positions of FIGURE 14, for lowering the two stud locator units 47. As the bars 46 of said units 47 move downwardly, a part of each bar contacts a plunger 146 of one of the microswitches 132 which is located therebeneath, so that when the bars 46 have reached their fully lowered positions of FIGURE 14 the plungers 146 will have been depressed, for closing the normally open microswitches 132 by which an electric circuit is completed through the relay 138 and the motor starter 137 for energizing the electric motor 88, for driving the two conveyor chains 96 which travel clockwise, as seen in FIGURE 5.

The two lugs 104 which are located under the sprocket wheels 95 will travel upwardly around said sprocket wheels and will assume positions on the chains 96, as seen in FIGURE 18, so that their upright leading edges 105 will simultaneously engage the left-hand-most stud 145 for conveying the assembled panel frame, composed of the parts 143, 144 and 145, from left to right along and off of the table 26. The top plate 143 and sill member 144 will ride on the two sets of rollers 39, while the studs 145 will ride on the rails 99 during this travel. Should any of the dogs 114 not be fully retracted by its spring 120, it will be deflected back to its fully retracted position by movement of the top plate 143 which is guided during its travel by the guides 43. As the driven endless conveyors, composed of the chains 96 and lugs 104, complete nearly one-half a circuit of travel, one of the other two lugs 104, which was initially located over one of the sprocket wheels 85, will strike the wand or blade 128 of the normally closed microswitch 127, for opening said microswitch to break the electric circuit to the motor 88 for de-energizing said motor. The chains will travel a short distance after the motor 88 is de-energized so that the lug 104 which actuates the switch 127 will travel on to a position beneath the sprocket wheel 95, due to the overrun of the chains, while the two lugs which engaged and moved the assembled frame will move to positions over the sprocket wheels 85 to complete the discharge of the assembled frame from the table 26. It will be apparent that the motor 88 cannot be energized except when the bars 46 are engaging the plungers 146 of the microswitches 132, so that the two stud locator units 47 must be in lowered positions whenever the endless conveyor is driven. It will also be apparent that the circuit to the motor 88 can always be broken by manually actuating either of the emergency switches 131 or 131'.

The apparatus 25 is also adapted to produce various modified panel frames. In some instances, double studs will be required, and where two studs 145 are located in abutting engagement with one another, one of the studs will rest on and depress a locator element 68 which will yield downwardly into its sleeve 69 against the resistance of its spring 75, until said stud, not shown, is resting on the rails 99. Additionally, prefabricated wall inserts, not shown, such as door and window frames of the type assembled on the apparatus as disclosed in U.S. Patent No. 3,244,416, issued April 5, 1966, entitled Apparatus for Prefabricating a Wall Insert, may be assembled in the frame being assembled in the apparatus 25 in a space thereof provided by omitted studs 145. Where parts of such an insert are disposed over the locator elements 68, such elements will be displaced downwardly as heretofore described.

As seen in FIGURES 9 and 10, a spacer block 147 is swingably mounted by a hinge 148 for movement between an inoperative position behind the squaring stop 41, as seen in FIGURE 10, to an operative position on the inner or front side of said squaring stop as seen in FIGURE 9. The block 147 in its operative position of FIGURE 9 provides an abutment for the end of the top plate 143 or sill 144 and for the first stud 145, for locating the outside of the first stud sixteen inches from the center of the second stud. It will be understood that each squaring stop 41 is provided with a block 147, both of which are used simultaneously. A support member 149 extends inwardly from each flange 38 beneath one of the squaring stops 41 and is disposed with its top surface flush with the top surface of the flange 37, to provide a support for the end of the top plate 143 or the sill 144 and for an end of the stud 145, which together with said top plate or sill engages either of the squaring stops 41 or its spacing block 147.

A hinge 150 is secured to the outer edge of each top flange 37 and has a leaf 151 carrying a spacing block 152. With the blocks 147 swung back to their inoperative positions of FIGURE 10, the leaves 151 may be swung over the top flanges 37 to position the spacing blocks 152 longitudinally of said flanges and each with an end abutting a squaring stop 41. The left hand ends of the top plate 143 and the sill 144 will then engage the other right hand ends of said blocks 152, for spacing said top plate and sill and the first stud 145 four and one-eighth inches from the squaring stops 41, for producing the frame of a corner panel and which is to be overlapped by an end of another panel disposed at a right angle thereto.

Various modifications and changes are contemplated and may obviously be resorted, to without departing from the function or scope of the invention as hereinafter defined by the appended claims.

I claim as my invention:

1. A panel frame assembling apparatus comprising an elongated supporting structure, transverse abutment means rising from said supporting structure adjacent one end thereof, fixed longitudinal abutment means rising from a first side of said supporting structure and forming a right angle with said transverse abutment means, fluid pressure actuated clamps supported on the other second side of said supporting structure, substantially coplanar supporting means carried by said sides of the supporting structure between said longitudinal abutment means and said clamps and adapted to support longitudinal frame elements along said sides of the supporting structure, stud supporting rails fixed to and extending longitudinally of said supporting structure and disposed between said supporting means, stud locating means disposed adjacent and substantially parallel to said rails, and means independent of the rails supporting said stud locating means and mounted for vertical sliding movement in said supporting structure for simultaneously moving the stud locating means into and out of engagement with the studs supported by the rails, said stud locating means including longitudinally spaced pairs of upright locator elements adapted to straddle the studs supported by said rails, when said means supporting the stud locating means is in a raised position, for locating the studs at predetermined spaced intervals relative to one another between and crosswise of said longitudinal frame elements preparatory to the studs being clamped between said longitudinal frame elements by actuation of said fluid pressure clamps.

2. A panel frame assembling apparatus as in claim 1, and driven conveyor means partially supported by and movable longitudinally in the supporting rails for conveying the assembled panel frame, composed of said longitudinal frame elements and studs, longitudinally of the supporting structure in a direction away from said transverse abutment means for discharge from the supporting structure, after release of said clamps and lowering of the stud locating means.

3. A panel frame assembling apparatus as in claim 1, said transverse abutment means including adjustable members adapted to be selectively engaged by complementary ends of said longitudinal frame elements and an end stud for spacing an end of the frame parts different distances from said end of the supporting structure.

4. A panel frame assembling apparatus as in claim 1, said longitudinal abutment means comprising longitudinally spaced abutment members having gaps therebetween disposed in alignment with said pairs of locator elements for providing access openings in said abutment means for nailing the longitudinal frame element which engages said abutment means to the studs.

5. A panel frame assembling apparatus as in claim 4, and said fluid pressure clamps being staggered relative to said pairs of locator elements to provide access spaces for nailing the other longitudinal frame element to the studs.

6. A panel frame assembling apparatus as in claim 1, each of said fluid pressure actuated clamps having a swingably mounted fluid pressure actuated clamping dog disposed for swinging movement simultaneously toward said transverse abutment means and said longitudinal abutment means when displaced from a retracted toward a projected position, for urging the longitudinal frame element engaged thereby simultaneously in two directions toward said longitudinal abutment means and the transverse abutment means.

7. A panel frame assembling apparatus as in claim 1, each of said stud locating means including a longitudinally extending bar, said locating elements comprising pins extending vertically through and slidably mounted in said bar, and spring means individual to and yieldably supporting the pins in elevated positions.

8. A panel frame assembling apparatus as in claim 1, said locating elements being mounted for individual sliding movement vertically of said stud locating means whereby selected ones of said elements may be displaced downwardly to retracted, inoperative positions when the stud locating means is in a raised, operative position.

9. A panel frame assembling apparatus as in claim 1, toggle linkages connected to said supporting structure and to said means supporting the stud locating means, and a push rod connected to each of the toggle linkages for raising or lowering said means supporting the stud locating means when the push rod is moved longitudinally thereof.

10. A panel frame assembling apparatus as in claim 9, and fluid pressure responsive means for effecting movement of the push rod in opposite directions.

11. A panel frame assembling apparatus as in claim 1, said conveyor means including a pair of endless driven chains each having at least one lug, said lugs being disposed in transverse alignment to one another for engaging an end stud of the assembled panel frame, said supporting rails defining upwardly opening channels in which top flights of said chains travel.

12. In a panel frame assembling apparatus, an elongated supporting structure having fixed abutments along one side and across one end thereof, fluid pressure actuated clamps disposed along the other side of said supporting structure and adapted to clamp transversely disposed studs resting on said supporting structure between longitudinally disposed frame elements one of which longitudinal frame elements engages said fixed side abutments and the other of which elements is engaged by said clamps; stud locator means, and means mounting said stud locator means and disposed for vertical sliding movement in said supporting structure, said stud locating means including pairs of upstanding locator elements each pair of which is adapted to straddle a stud when said locator means is in an elevated position for holding the studs correctly located for clamping between said longitudinal frame elements, said means mounting the stud locator means being displaceable downwardly as a unit to an inoperative position for simultaneously disengaging the locator elements from the studs to permit sliding movement of the assembled frame, composed of the longitudinal frame elements and studs, endwise off of the supporting structure after release of said clamps.

13. In a panel frame assembling apparatus as in claim 12, driven conveyor means carried by said supporting structure and engageable with the assembled frame for discharging the frame in a longitudinal direction from the supporting structure when the stud locator means is in an inoperative position.

14. In a panel frame assembling apparatus including an elongated supporting structure in which longitudinal frame elements and studs are adapted to be supported and assembled to provide a wall panel frame; transversely spaced bars mounted for vertical sliding movement in said supporting structure, transversely aligned longitudinally spaced stud straddling means mounted in upright positions in the bars and adapted to hold the studs correctly located between the longitudinal frame elements, when the bars are in raised positions, and which are disengageable from the studs when the bars are displaced downwardly to retracted, inoperative positions to permit removal of the panel frame from the apparatus without lifting to prevent distortion of the panel frame, and means mounting said upright stud straddling means for individual sliding movement vertically relative to said bars whereby selected ones of said upright stud straddling means may be displaced downwardly to retracted, inoperative positions when said bars are in raised, operative positions.

(References on following page)

References Cited by the Examiner

UNITED STATES PATENTS

| | | | |
|---|---|---|---|
| 1,209,705 | 12/1916 | Hayward | 144—2 |
| 1,254,044 | 1/1918 | Johnson | 269—316 |
| 2,322,368 | 6/1943 | Lacey | 144—288 |
| 2,626,643 | 1/1953 | Kantzler | 269—321 |
| 2,685,824 | 8/1954 | Coop | 269—317 |
| 2,810,414 | 10/1957 | Wilson | 269—321 |
| 2,884,967 | 5/1959 | Le Vay | 144—288 |
| 2,916,883 | 12/1959 | Geck | 269—26 X |
| 3,056,600 | 10/1962 | Merrick | 269—304 |
| 3,086,210 | 4/1963 | Good | 227—152 |

HAROLD D. WHITEHEAD, *Primary Examiner.*